United States Patent [19]

Yeo

[11] Patent Number: 5,521,480
[45] Date of Patent: May 28, 1996

[54] APPARATUS AND METHOD FOR DEFINING A REFERENCE POSITION OF A TOOL

[75] Inventor: Daren C. Yeo, Stafford, Conn.

[73] Assignee: Gerber Scientific Products, Inc., Manchester, Conn.

[21] Appl. No.: 299,758

[22] Filed: Sep. 1, 1994

[51] Int. Cl.$^6$ .................................................. G05B 1/06
[52] U.S. Cl. ........................... 318/626; 318/600; 318/652
[58] Field of Search ..................................... 318/560, 569, 318/570, 574, 575, 600–605, 626, 652

[56] References Cited

U.S. PATENT DOCUMENTS

| | | |
|---|---|---|
| 3,602,700 | 8/1971 | Jerva et al. . |
| 3,612,976 | 10/1971 | Tripp . |
| 3,668,500 | 6/1972 | Kosem . |
| 3,752,969 | 8/1973 | Kiffmeyer et al. . |
| 4,095,157 | 6/1978 | Klauser . |
| 4,266,170 | 5/1981 | Inoue . |
| 4,435,674 | 3/1984 | Hevenor et al. . |
| 4,467,525 | 8/1984 | Logan et al. . |
| 5,213,656 | 5/1993 | Lis et al. . |

Primary Examiner—Bentsu Ro
Attorney, Agent, or Firm—McCormick, Paulding & Huber

[57] ABSTRACT

A method and apparatus for defining a reference position of a tool with respect to at least one direction of movement is provided. The reference position is defined by comparing a position to which the tool has been commanded with the actual position of the tool with respect to the direction of movement. Lag data indicative of the difference is compared to a predetermined lag value, and advancement of the command position is terminated in response to lag data exceeding the predetermined data. The reference position is defined with respect to such lag data.

10 Claims, 4 Drawing Sheets

APPARATUS AND METHOD FOR DEFINING A REFERENCE POSITION OF A TOOL

FIELD OF THE INVENTION

The present invention relates generally to an apparatus and method for controllably moving a tool in at least one direction of movement for performing a work operation. More particularly, the invention relates to such an apparatus and method which positions the tool with respect to a home or reference position establishing the limit of movement of the tool in at least one direction.

BACKGROUND OF THE INVENTION

A number of apparatus for controllably moving a tool in order to perform a work operation are known. Examples include ink jet and thermal printers, fabric cutters, signmaking devices and plotters. Typically, such apparatus include a computer control unit for moving the too, such as a knife, pen, scribe or ink jet head, mounted on a carriage back and forth in at least one direction according to a pre-programmed set of instructions. The control unit positions the tool in the direction of movement in relation to a reference or home position, which defines the limit of movement of the tool in that direction while the apparatus is performing the work operation. Accordingly, prior to beginning the work operation, the apparatus must establish the home position to insure accurate positioning of the tool by the control unit.

In the past, a limit switch has been employed to establish the tool's home position. At the limit of the tool's movement in a respective direction, the carriage supporting the tool engages and depresses a spring loaded plunger. The plunger activates a switch which sends a signal to the computer control unit indicating that the tool has reached its limit of travel. The disadvantages associated with such an arrangement are that the spring and switch are subject to mechanical failure. Failure of the switch not only results in down time for the apparatus, but also requires the expenditure of time and expense to have the limit switch repaired.

Accordingly, it is an object of the present invention to provide an apparatus for determining the home position of a tool mounted for movement in at least one direction which does not require a limit switch for signaling that the tool has reached its limit of travel.

It is a further object of the invention to provide a method for operating such an apparatus.

SUMMARY OF THE INVENTION

The present invention provides, in one aspect, an apparatus for defining a reference position of a tool based on the difference or lag between where the tool is actually positioned with respect to at least one direction of movement and a position to which the tool has been commanded to move. The apparatus includes a motor for moving the tool back and forth in the direction of movement, and means coupled to the motor for generating position signals indicative of the position of the tool. The apparatus further includes means for transmitting command signals to the motor to move the tool to a commanded position with respect to the direction of movement, and means for generating lag signals indicative of the difference between the command signals and the position signals, i.e., the difference between where the tool is supposed to be with respect to the direction of movement as directed by the command signals and where the tool actually is based on movement by the motor. Means are also provided for comparing the lag signals to a predetermined or maximum lag value. The predetermined or maximum lag value is indicative of the tool reaching a stop position in the direction of movement. The reference position is defined based on a position signal corresponding to a lag signal which exceeds the predetermined lag value.

The motor for moving the tool back and forth in the direction of movement is a servo motor coupled with an encoder. The encoder provides information regarding the position of the tool based on the rotational position of the motor shaft. It should be understood, however, that the invention is in no way limited in this regard and that any means commonly employed by those skilled in the art for generating signals indicative of the position of the tool in the direction of movement may be employed, such as, for example, an optical signal generator.

In the preferred embodiment of the invention, a central computer control unit having signal generating, memory storage and data processing capabilities provides the means for transmitting the command signal to the motor to position the tool, the means for generating lag signals indicative of the difference between the command signals and the position signals and the means for comparing the lag signals to a predetermined lag value and subsequently defining the reference position. However, a system having separate components hard wired together to perform these functions could also be employed.

The invention provides, in a second aspect, a method for defining a reference position of a tool in at least one direction of movement. The method includes the steps of transmitting commands to a motor to advance the tool to a commanded position in the direction of movement, and measuring the actual position of the tool with respect to the direction of movement. The commanded position is then compared to the measured position, and lag data indicative of the difference between the commanded position and the measured position is generated. The lag data is then compared to a predetermined or maximum lag value, and the advancement of the command position is terminated if the lag data exceeds the predetermined lag value. As noted above, the predetermined or maximum lag value is indicative of the tool reaching a stop position in the direction of movement. The reference position is defined based on a position signal corresponding to a lag signal which exceeds the predetermined value.

DETAILED DESCRIPTION OF THE PREFERRED EMBODIMENT

Figure 1:
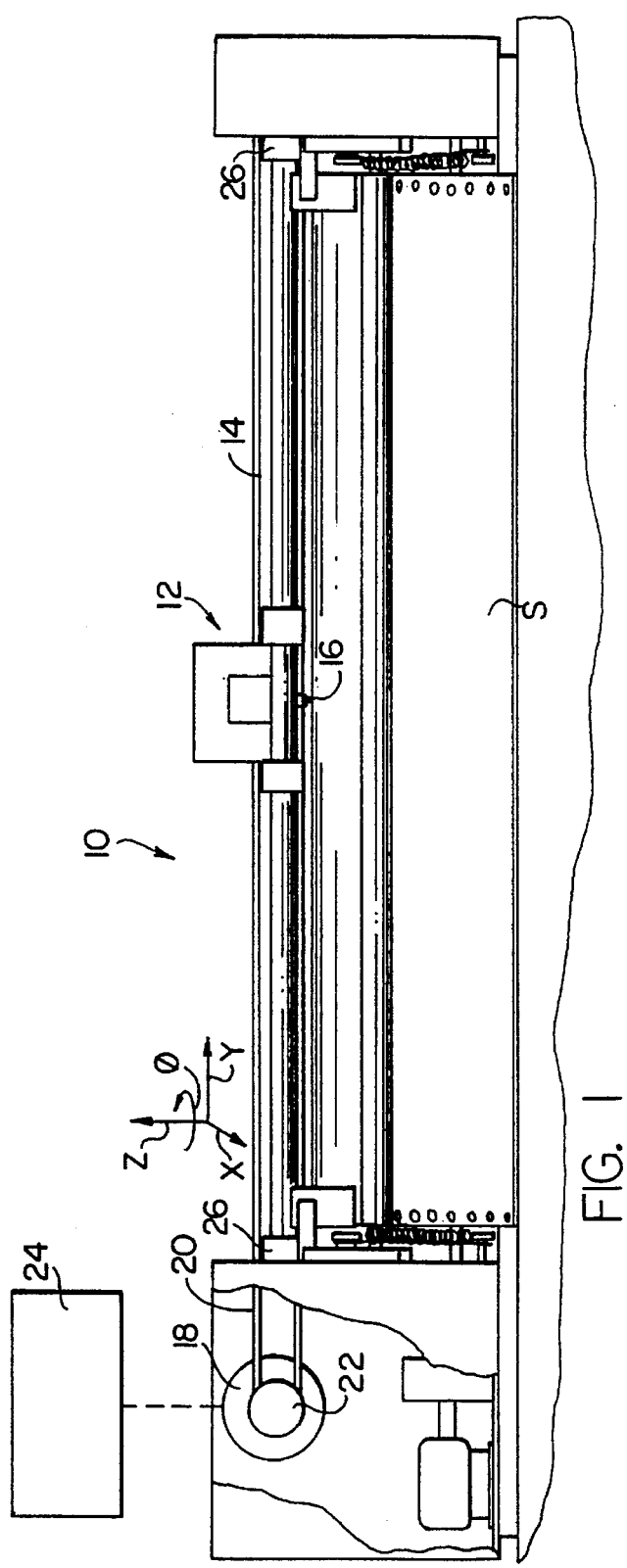
FIG. 1 is a partially schematic front view of an apparatus embodying the invention.
Figure 2:
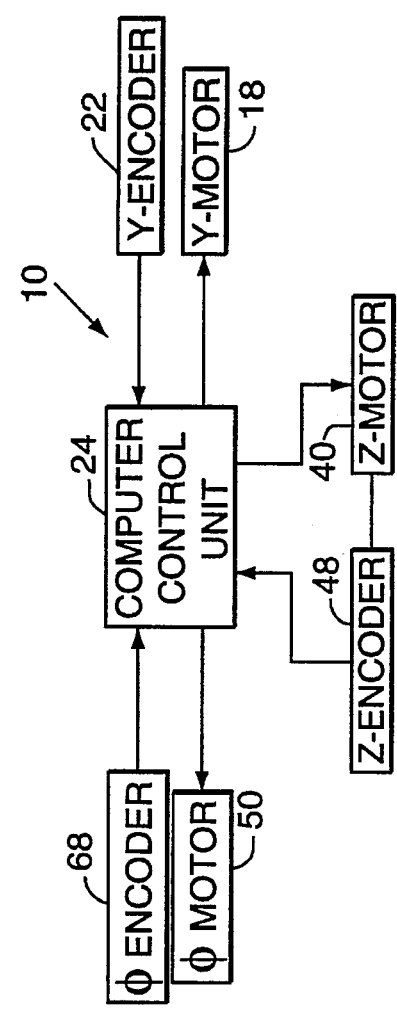
FIG. 2 is a schematic illustration of the apparatus shown in FIG. 1.

In FIGS. 1 and 2, an apparatus embodying the present invention is indicated generally by the reference numeral 10.

The apparatus 10 is utilized for generating sign text on sheet material, such as a thermoplastic material adhesively secured to a release liner. An apparatus of the general type illustrated in FIGS. 1 and 2 is fully disclosed in U.S. Pat. No. 4,467,525, the disclosure of which is herein incorporated herein by reference. It should be understood, however, that the invention is in no way limited to a sign making apparatus, but encompasses any apparatus in which a tool is controllably moved in at least one direction in relation to a reference or home position. Accordingly, the tool may be, for example, a blade, marker, scribe, laser, ink jet printhead, etc.

As shown in FIG. 1, the apparatus 10 comprises a tool carriage assembly 12 mounted on a guide rail 14 extending in the Y-coordinate direction and carrying a tool 16. In the illustrated embodiment, the tool 16 is a blade for cutting the top layer of the sheet S into letters, characters or other graphic indicia. The sheet S is comprised of a vinyl layer marketed in various colors under the brand name "SCOTCHCAL" by 3M Corporation and has a thickness between about 0.003 and 0.004 inches. The vinyl material is supplied with a pressure sensitive adhesive on one surface, and the adhesive secures the material to a carrier laminate or release liner which may be a 90-pound paper coated with silicone to release the vinyl and the adhesive after cutting.

The tool carriage assembly 12 is driven in the Y-coordinate direction along the guide rail 14 by a Y-motor 18 and drive belt 20. The Y-motor is preferably a servomotor, and a Y-encoder 22 is mounted to the Y-motor and coupled to a computer control unit 24 for transmitting data indicative of the position of the Y-motor, and thus of the tool 16 along the Y-axis, as is described further below.

As shown in FIG. 1, a pair of Y-stops 26 are mounted on either end of the guide rail 14 to stop movement of the tool carriage assembly in either direction along the Y-axis.

Figure 3:
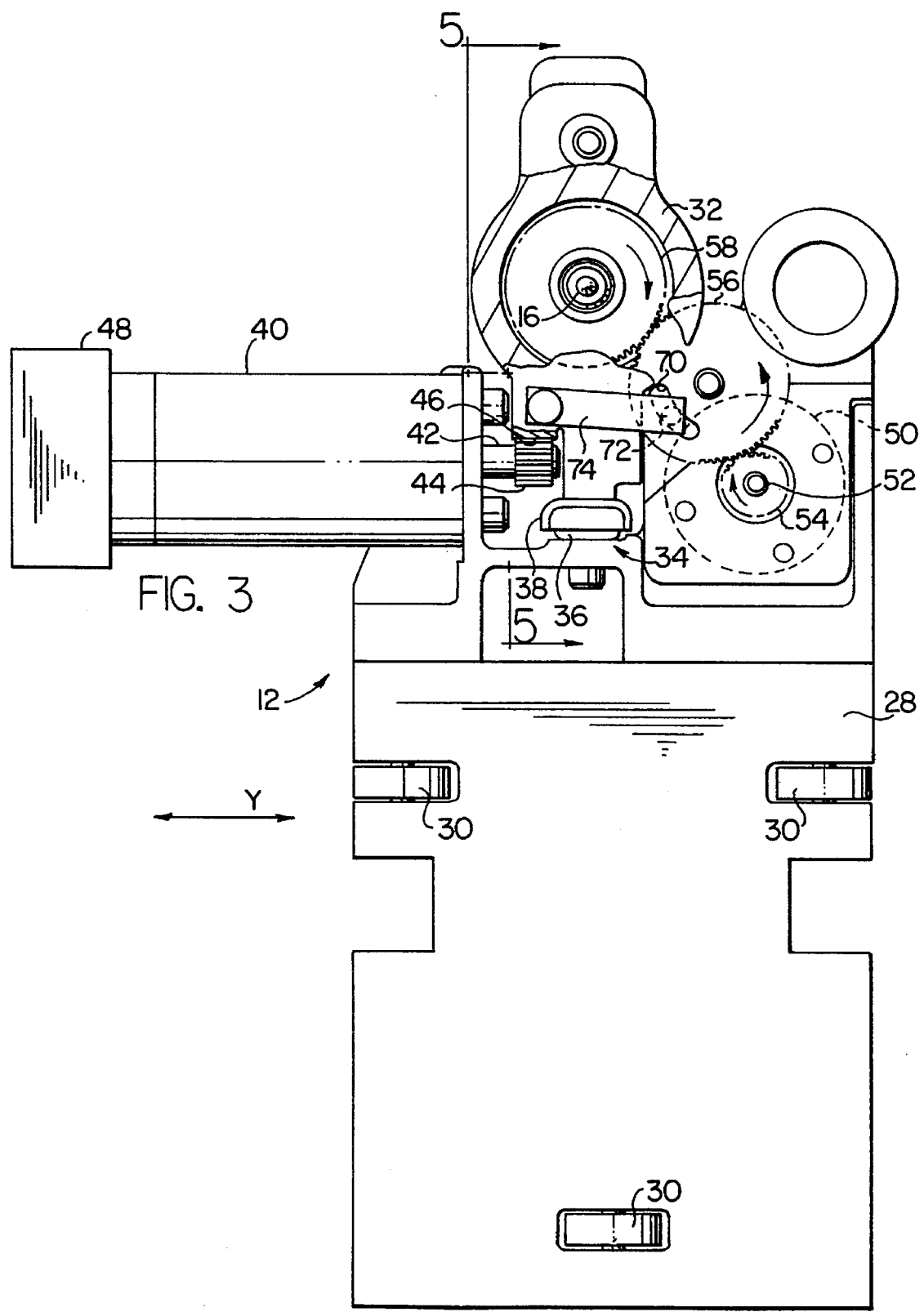
FIG. 3 is a bottom view in partial cross-section of the tool carriage assembly which forms a part of the apparatus shown in FIG. 1.
Figure 4:
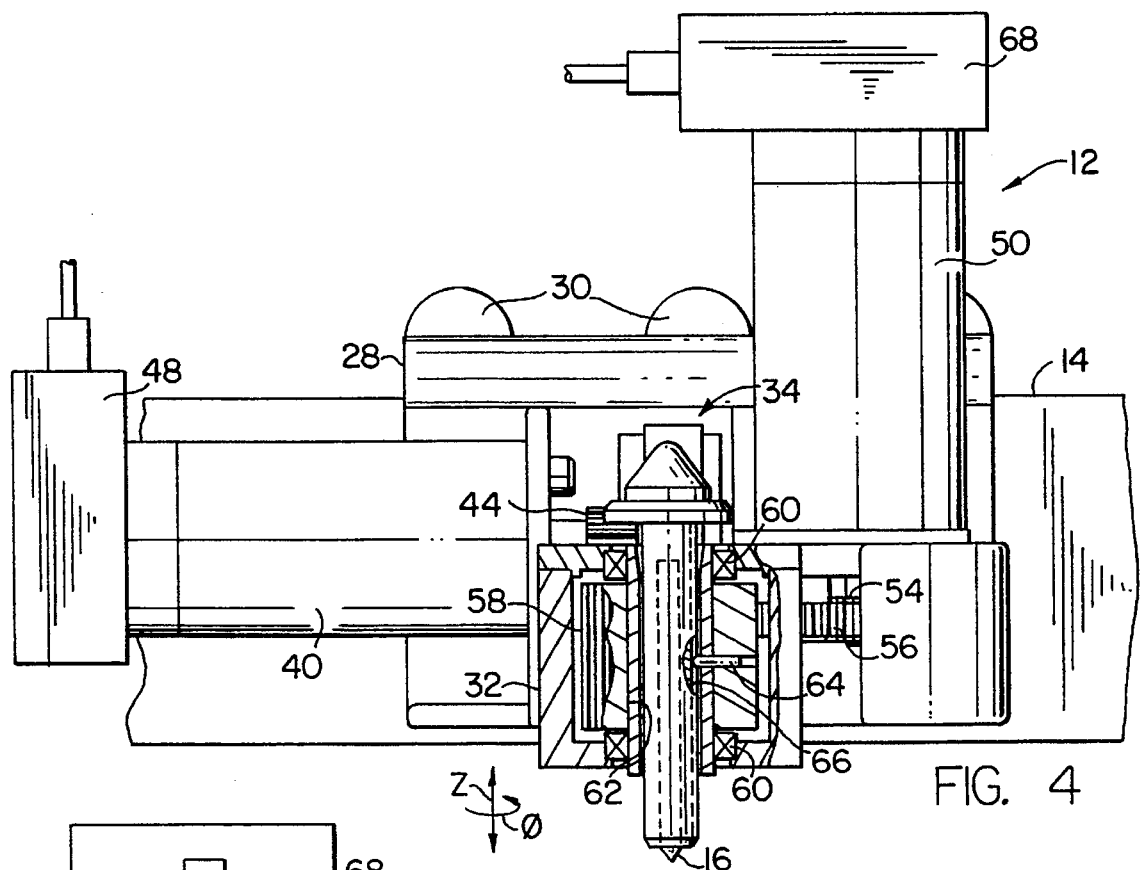
FIG. 4 is a front view of the tool carriage assembly shown in FIG. 3.
Figure 5:
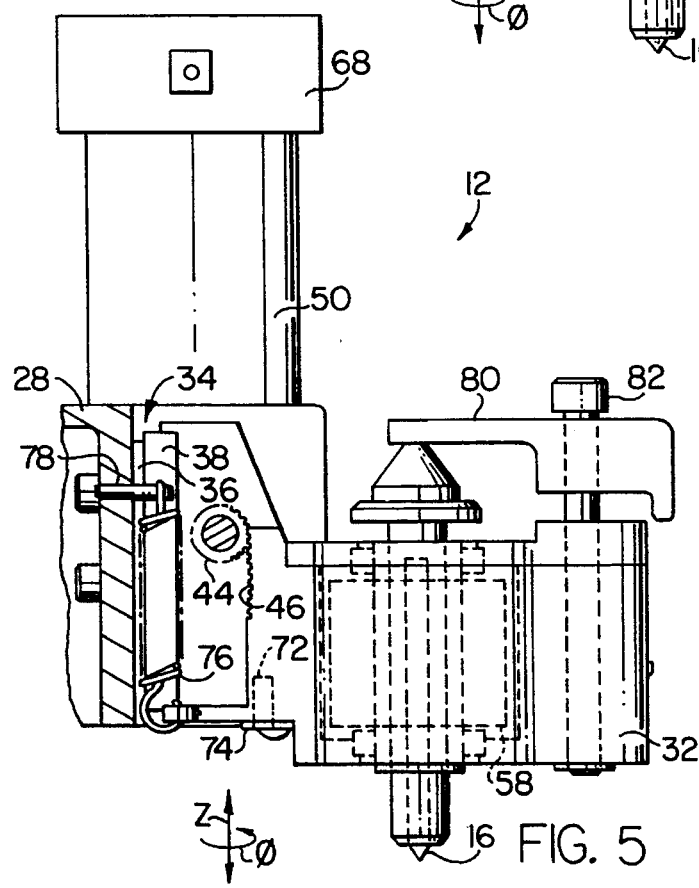
FIG. 5 is a partial cross-sectional view of the tool carriage assembly shown in FIG. 3 taken along the line 5—5.

Turning to FIGS. 3–5, the tool carriage assembly 12 comprises a y-carriage 28 mounted by wheels 30 to a guide rail 14 for movement of the tool 16 in the Y-coordinate direction, and a Z-carriage 32 for moving the tool in the Z-coordinate direction. As shown in FIGS. 3 and 5, the Z-carriage 32 is coupled to the Y-carriage 28 by a linear bearing assembly 34 including an elongated slide 36 mounted on the Y-carriage, a corresponding rail 38 is mounted on the Z-carriage, and a plurality of ball bearings (not shown) seated between the slide and rail for movement of the Z-carriage and rail along the slide in the Z-direction.

As shown best in FIG. 3, a Z-motor 40 is mounted on the Y-carriage 28 and includes a drive shaft 42 keyed to a Z-pinion gear 44. As shown in FIGS. 3 and 5, the Z-pinion 44 meshes with a corresponding toothed rack 46 fixedly mounted to the Z-carriage 32 and extending along the Z-axis, so that upon rotation of the Z-motor, the Z-pinion drives the rack and Z-carriage along the Z-axis. the Z-motor 40 is preferably a servo-motor, and a Z-encoder 48 is mounted to the Z-motor and coupled to the computer control unit 24 for transmitting data indicative of the position of the Z-motor, and thus of the Z-carriage and tool 16 along the Z-axis, as is described further below.

As also shown in FIG. 3 a Ø-motor 50 is mounted on the Y-carriage 28 and includes a drive shaft 52 keyed to a Ø-pinion gear 54 for rotational movement of the tool in the Ø-coordinate direction. The Ø-pinion 54 meshes with a Ø-idler gear 56 also mounted on the Y-carriage, which in turn meshes with a Ø-drive gear 58 mounted on the Z-carriage. As shown best in FIG. 4, the Ø-drive gear 58 is received within a substantially cylindrical, hollow interior of the Z-carriage, and is mounted on opposite ends to the carriage by bearings 60. As shown in FIGS. 4 and 5, the Ø-drive gear 58 extends in the Z-direction along a substantial portion of the Z-carriage, and defines a tool bore 62 extending along the Z-axis for receiving the tool 16. The axially-elongated teeth of the Ø-drive gear permit movement of the gear with the Z-carriage along the Z-axis without disengaging the Ø-drive gear from the Ø-idler. A guide pin 64 is fixed within the Ø-drive gear and received within an axially-elongated slot 66 of the tool for fixing the tool relative to the Ø-drive gear, as shown in phantom in FIG. 4. Accordingly, rotation of the Ø-drive motor 50, drives the Ø-idler 56, which in turn drives the Ø-drive gear 58 and tool 16 in the Ø-direction, as illustrated typically by the arrows in FIG. 3. The Ø-motor 50 is also preferably a servo-motor, and a Ø-encoder 68 is mounted to the Ø-motor and coupled to the computer control unit 24 for transmitting data indicative of the position the Ø-motor, and thus of the angular position of the tool 16 in the Ø-direction, as is described further below.

As shown in FIG. 3, the Ø-idler gear 56 defines a stop slot 70 for receiving a Ø-locking pin 72 (shown in phantom) to lock the Ø-idler and Ø-drive gear, and thus the tool 16 in a stop position with respect to the Ø-direction. As shown in FIGS. 3 and 5, the Ø-locking pin 72 is slidably received within an aperture formed in the base of the Z-carriage, and is biased upwardly toward the Ø-idler gear 56 by a leaf spring 74. As also shown in FIG. 5, a tension spring 76 extending substantially in the direction of the Z-axis is coupled on one end to the base of the Z-carriage and coupled on the other end to a pin 78 fixedly mounted to the Y-carriage. The tension spring 76 normally biases the Z-carriage upwardly in the Z-direction toward the stop position, at which point the bottom edge of the slide 36 acts as a stop by engaging the bottom edge of the rail 38 and preventing further upward movement of the Z-carriage in the Z-direction. When the Z-carriage is located in its stop position, the leaf spring 74 biases the Ø-locking pin 72 upwardly into engagement with the underside of the Ø-idler gear 56 so that upon rotating the stop slot 70 into alignment with the Ø-Locking pin 72, the locking pin is driven upwardly by the leaf spring into the slot to lock the idler gear, and thus the tool 16 in its home position with respect to the Ø-direction, i.e., its rotational movement in the Ø-direction.

As shown in FIG. 5, the Z-carriage 32 includes a tool force arm 80 engaging the top end of the tool 16, which is spring biased downwardly into engagement with the tool to press the tool against the surface of the sheet S. An adjustment know 82 is provided on the tool force arm to adjust the bias of the spring (not shown), and thereby adjust the force of the tool against the sheet S.

Figure 6:
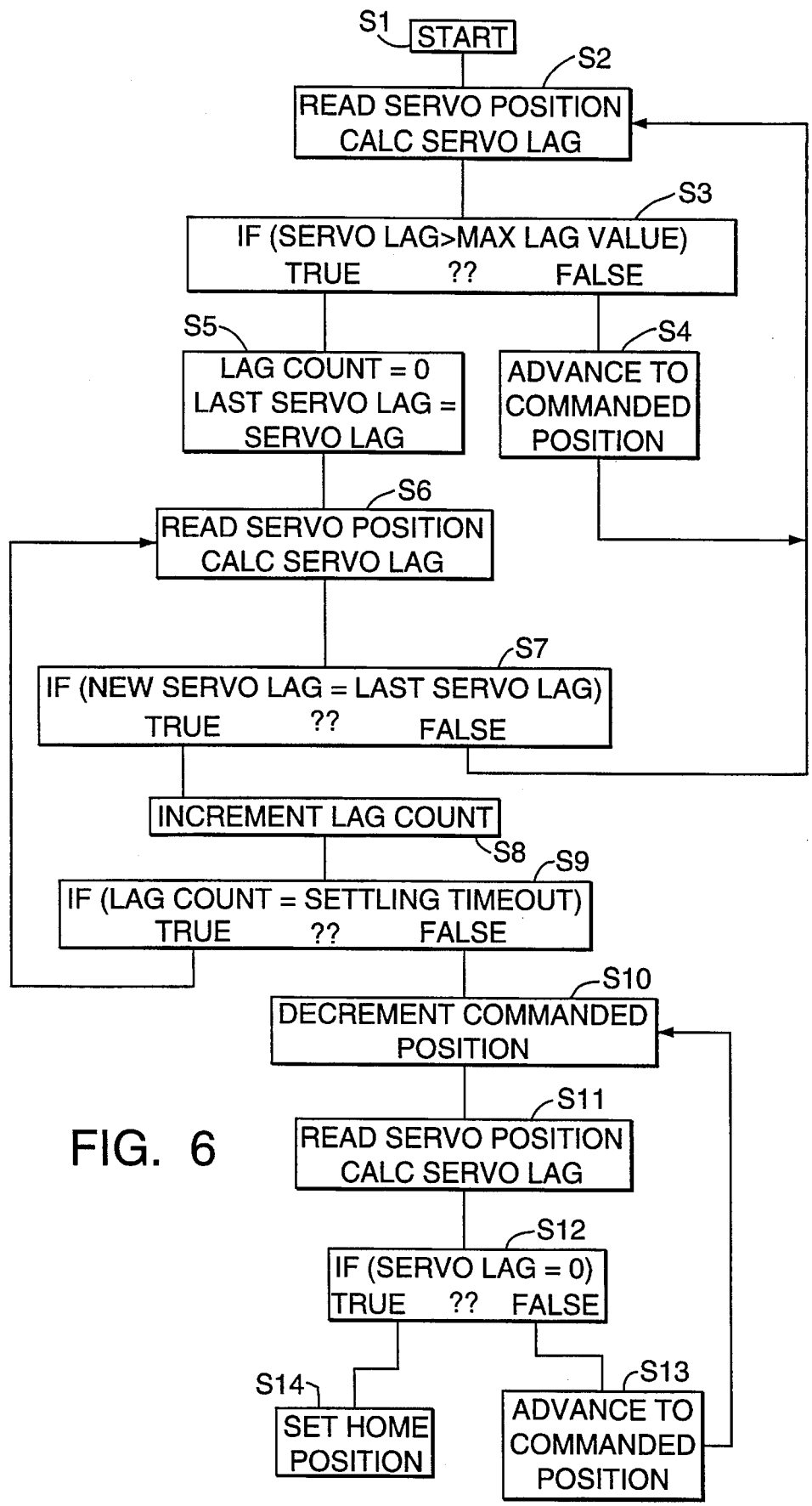
FIG. 6 is a flow chart illustrating the procedural steps of operating the apparatus shown in FIG. 1 according to the invention.

Turning to FIG. 6, a flow chart illustrates conceptually the procedural steps of the present invention for defining a reference or home position, or otherwise defining the limit of movement of the tool with respect to each direction of movement. In the exemplary embodiment of the invention, the tool 16 has three directions of motion, the Y, Z and Ø directions, and prior to performing a work operation, the computer control unit 24 determines the home position of the tool for each axis. Preferably, the processor determines the three home positions in seriatim, performing essentially the same procedural steps for each home position determination. In the exemplary embodiment of the invention, the home positions are determined for the Y, Z and then Ø directions, respectively.

At the start of a work operation, the computer control unit 24 reads the servo position for the respective servomotor, and determines the respective servo lag, indicated by steps S1 and S2 of FIG. 6. The servo lag is the difference between the actual servo position as indicated by the respective encoder and the command position, i.e., the position to which the computer control unit commands the motor and thus the tool to travel in the respective direction. As described above, in the exemplary embodiment of the invention having Y, Z and Ø directions of motions, these procedural steps are first carried out with respect to the Y direction of motion, and then for the Z and Ø directions, respectively. The computer control unit then compares the servo lag as indicated by the respective encoder to a corresponding maximum lag value, as indicated by step S3. The computer control unit contains a database of maximum lag values for each direction of motion, and each maximum lag value is indicative of the tool reaching a stop position for the respective direction. With respect to the Y-axis, the stop position is defined by the stop 26 on the end of the guide rail 14, which engages the Y-carriage and prevents further movement of the tool in the Y-direction. For the Z-direction, the stop position is defined by the bottom edge of the slide 36, which engages the bottom edge of the rail 38 and prevents further upward movement of the Z-carriage and tool in the Z-direction. And for the Ø-direction, the stop position is defined when the Ø-locking pin is received within the stop slot 70 of the idler gear 56, which in turn prevents further movement of the Ø-drive gear 58 and tool 16.

If the measured servo lag is less than the corresponding maximum lag value, the computer control unit advances the command position so as to control the respective motor to continue advancing either the Y-carriage in the Y-direction toward the Y-stop position, the Z-carriage in the Z-direction toward the Z-stop position, or the Ø-drive gear 58 in the Ø-direction toward the Ø-stop position, as indicated by step S4. The computer control unit then repeats the steps of advancing the command position along the respective axis, calculating the servo lag, and comparing the servo lag to the maximum lag value until the servo lag exceeds the maximum value (steps S2–S4).

When the servo lag exceeds the maximum value, the computer control unit stops advancing the command position and sets a lag count, as indicated by step S5. Then, in order to ensure that the tool has actually reached the respective stop position, i.e., either the Y or Z-carriage has engaged the respective stop, or the Ø-locking pin has been received within the stop slot, the computer control unit leads the respective servo position, calculates a new servo lag and compares the new servo lag to the last servo lag, as indicated by steps S6 and S7. If the new servo lag does not equal the last servo lag, this is an indication that the tool movement has not stopped, and the computer control unit returns to step S2. If, on the other hand, the new servo lag equals the last servo lag, then the computer control unit increments the lag count, and compares the incremented lag count to a settling time-out count, as indicated by steps S8 and S9. Steps S6 through S9 are repeated until the incremented lag count equals the settling time-out count, the latter of which is selected to provide sufficient time for the respective motor and/or carriage to settle in the stop position.

Once the incremented lag count equals the settling time-out count, the computer control unit decrements the command position in the respective direction (step S10), or in other words reverses the commanded direction of movement until the command position corresponds with the respective actual position. The computer control unit then repetitively decrements the command position, reads the servo position, and calculates the servo lag until the lag is substantially equal to zero, as indicated by steps S10–S13. Once the servo lag is substantially equal to zero, i.e., within a predetermined tolerance range (e.g., +/–15 counts of the encoder), the computer control unit sets the home position for the respective direction, as indicated by step S14. With respect to the Y and Z directions, the Y home position is selected so that the Y-carriage is spaced slightly away from the guide rail stop 26 (e.g., about 0.125 inch), and the Z home position is selected so that the bottom edge of the rail 38 of the Z-carriage is spaced slightly away from the bottom edge of the slide 36 in order to prevent the respective parts from contacting one another when driven into the home position. The Ø home position, on the other hand, may be at least equal to the Ø stop position, because the Ø-lockup pin cannot be received within the stop slot unless the Z-carriage is also in the home position, and thus there is typically no concern with respect to contact between the parts during operation of the apparatus. If, however, there is such a concern, the Ø home position may be spaced away from the Ø stop position in the same manner as with the other home positions.

While preferred embodiments have been shown and described, various modifications and substitutions may be made without departing from the spirit and scope of the invention. For example, as noted above, although in the preferred embodiment the tool is moved back and forth in three directions, the invention also applies to an apparatus in which the tool is moved in fewer or more directions. Accordingly, it is to be understood that the present invention has been described by way of example and not by limitation.

I claim:

1. An apparatus for defining a reference position of a tool with respect to at least one direction of movement, comprising:

at least one motor for moving the tool in the at least one direction of movement;

means coupled to the motor for generating position signals indicative of the position of the tool in the at least one direction of movement;

means for transmitting command signals to the motor to move the tool to a commanded position with respect to the at least one direction of movement;

means for generating lag signals indicative of the difference between the command signals and the position signals; and means for comparing the lag signals to a predetermined lag value and defining the reference position based on a position signal which corresponds to a lag signal exceeds the predetermined lag value.

2. The apparatus of claim 1 wherein the motor is a servo motor.

3. The apparatus of claim 2 wherein the means for generating position signals is an encoder.

4. The apparatus of claim 1 wherein the means for transmitting command signals, the means for generating lag signals and the means for comparing and defining is a computer control unit.

5. The apparatus of claim 1 further including mens defringing the limit of travel of the tool in the direction of movement.

6. A method for defining a reference position of a tool in at least one direction of movement, comprising the following steps:

(a) transmitting commands to a motor to advance the tool to a commanded position in the at least one direction of movement;

(b) measuring the position of the tool in the at least one direction of movement;

(c) comparing the commanded position to the measured position of the tool in the at least one direction of movement, and generating lag data indicative of the difference between the commanded position and the measured position;

(d) comparing the lag data to a predetermined lag value, and terminating advancement of the command position in response to the lag data exceeding the predetermined lag value; and (e) defining the reference position based on a position signal which corresponds to a lag data exceeding the predetermined value.

7. The method of claim 6 wherein steps (a)–(d) are repeated if the comparison in step (d) does not result in lag data which exceeds the predetermined lag value.

8. The method of claim 6 further characterized in that after step (d) the method further includes the step of (f) setting a lag count and repeating steps (b)–(d).

9. The method of claim 8 further characterized in that when the difference compared in step (c) equals the difference compared in the repeated step (c), the method further includes the step of (g) incrementing the lag count and comparing the incremented lag count to a settling time out count.

10. The method of claim 9 further characterized in that steps (b)–(d), (f) and (g) are repeated unless the lag count equals the settling time out count.

\* \* \* \* \*